(12) United States Patent
Shen et al.

(10) Patent No.: US 11,527,052 B2
(45) Date of Patent: Dec. 13, 2022

(54) METHOD AND APPARATUS FOR CONTROLLING PLACEMENT OF VIRTUAL CHARACTER AND STORAGE MEDIUM

(71) Applicant: TENCENT TECHNOLOGY (SHENZHEN) COMPANY LIMITED, Shenzhen (CN)

(72) Inventors: Chao Shen, Shenzhen (CN); Xueqiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 23 days.

(21) Appl. No.: 17/325,187

(22) Filed: May 19, 2021

(65) Prior Publication Data

US 2021/0272380 A1    Sep. 2, 2021

Related U.S. Application Data

(63) Continuation of application No. 16/538,147, filed on Aug. 12, 2019, now Pat. No. 11,049,329, which is a (Continued)

(30) Foreign Application Priority Data

Jul. 25, 2017   (CN) .......................... 201710613071.2

(51) Int. Cl.
*G06T 19/20*     (2011.01)
*H04W 4/029*   (2018.01)
(Continued)

(52) U.S. Cl.
CPC .............. *G06T 19/20* (2013.01); *G06F 3/011* (2013.01); *G06T 13/40* (2013.01); *G06T 19/006* (2013.01); *H04W 4/021* (2013.01); *H04W 4/029* (2018.02)

(58) Field of Classification Search
CPC ......... G06T 19/20; G06T 13/40; H04W 4/029
(Continued)

(56) References Cited

U.S. PATENT DOCUMENTS

2009/0267950 A1*  10/2009  Finn .................... G06T 13/40
                                                              345/474
2013/0271457 A1   10/2013  Haswell et al.
(Continued)

FOREIGN PATENT DOCUMENTS

CN         1414496 A       4/2003
CN       104539929 A       4/2015
(Continued)

OTHER PUBLICATIONS

The Japan Patent Office (JPO) Notification of Reasons for Refusal for Application No. 2019-572111 and Translation dated Feb. 24, 2021 16 Pages.
(Continued)

*Primary Examiner* — Thomas J Lett
(74) *Attorney, Agent, or Firm* — Anovalaw Group PLLC

(57) ABSTRACT

A method for controlling placement of a virtual character includes: displaying a virtual character at a first position in a virtual reality (VR) scene; receiving a first instruction in the VR scene, the first instruction indicating moving the virtual character from the first position by a designated movement; displaying, in response to receiving the first instruction, third indication information as a preview of the designated movement in the VR scene; determining, according to the first instruction, a second position by the designated movement from the first position in response to the first instruction; removing the virtual character from the first position; and placing the virtual character at the second
(Continued)

position, the virtual character not appearing between the first position and the second position after being removed from the first position.

20 Claims, 8 Drawing Sheets

Related U.S. Application Data continuation of application No. PCT/CN2018/096646, filed on Jul. 23, 2018.

(51) Int. Cl.
    *G06F 3/01*     (2006.01)
    *G06T 13/40*    (2011.01)
    *G06T 19/00*    (2011.01)
    *H04W 4/021*    (2018.01)

(58) Field of Classification Search
    USPC .......................................................... 345/633
    See application file for complete search history.

(56)              References Cited

U.S. PATENT DOCUMENTS

| 2017/0024934 | A1 | 1/2017  | Numaguchi et al. |
| 2017/0291110 | A1 | 10/2017 | Ueno et al. |
| 2018/0348987 | A1 | 12/2018 | Sawaki |

FOREIGN PATENT DOCUMENTS

| CN | 105094920   | A  | 11/2015 |
| CN | 105183296   | A  | 12/2015 |
| CN | 105913497   | A  | 8/2016  |
| CN | 106094639   | A  | 11/2016 |
| CN | 106502395   | A  | 3/2017  |
| CN | 106527722   | A  | 3/2017  |
| CN | 106598465   | A  | 4/2017  |
| CN | 106621324   | A  | 5/2017  |
| CN | 106774872   | A  | 5/2017  |
| CN | 107450747   | A  | 12/2017 |
| JP | H07236769   | A  | 9/1995  |
| JP | 2009112631  | A  | 5/2009  |
| JP | 2016123479  | A  | 7/2016  |
| JP | 2016214807  | A  | 12/2016 |
| WO | 2015159561  | A1 | 10/2015 |

OTHER PUBLICATIONS

Nfamous Second Son, Weekly Famitsu Jun. 5, 2014 issue, Kadokawa Co., Ltd., May 22, 2014, pp. 74 to 81. 9 pages.

The European Patent Office (EPO) The Extended European Search Report for 18837684.2 dated Jan. 27, 2020 10 Pages.

Anonymous, "Locomotion in VR: Overview of different locomotion methods on HTC Vive—YouTube," Jun. 17, 2016 (Jun. 17, 2016), Retrieved from the Internet URL: https://www.youtube.com/watch?v=p0YxzgQG2-E [retrieved on Oct. 25, 2019], Video 1:35-3:33. 3 Pages.

Evren Bozgeyikli et al., "Point & Teleport Locomotion Technique for Virtual Reality," Proceedings of the 2016 Annual Symposium on Computer-Human Interaction in Play, Oct. 19, 2016 (Oct. 19, 2016), New York, NY, USA, pp. 205-216. 12 pages.

The World Intellectual Property Organization (WIPO) International Search Report for PCT/CN2018/096646 dated Oct. 26, 2018 6 Pages (including translation).

The State Intellectual Property Office of the People's Republic of China (SIPO) Office Action 1 for 201710613071.2, dated Mar. 2, 2018 7 Pages (including translation).

The State Intellectual Property Office of the People's Republic of China (SIPO) Office Action 2 for 201710613071.2 dated May 14, 2018 9 Pages (including translation).

\* cited by examiner

METHOD AND APPARATUS FOR CONTROLLING PLACEMENT OF VIRTUAL CHARACTER AND STORAGE MEDIUM

CROSS-REFERENCES TO RELATED APPLICATIONS

This application is a continuation of U.S. application Ser. No. 16/538,147 filed on Aug. 12, 2019. U.S. application Ser. No. 16/538,147 is a continuation of PCT Application No. PCT/CN2018/096646 filed on Jul. 23, 2018, which in turn claims priority to Chinese Patent Application No. 201710613071.2, entitled "METHOD AND APPARATUS FOR CONTROLLING PLACEMENT OF VIRTUAL CHARACTER" filed with the National Intellectual Property Administration, PRC on Jul. 25, 2017. The three references are incorporated by reference in their entirety.

FIELD OF THE TECHNOLOGY

Embodiments of the present application relate to the computer field, and specifically, to a method and an apparatus for controlling placement of a virtual character, and related storage medium.

BACKGROUND OF THE DISCLOSURE

How to control free movement of a virtual character in virtual space has been an important issue since three-dimensional (3D) games appeared. There were various methods for controlling movement of a virtual character in early stage of development of game devices and platforms. Thereafter, standardized methods for designing and implementing free movement of a virtual character in virtual space emerged, design standards were formed, and accordingly users formed user operation habit.

SUMMARY

Embodiments of the present application provide a method and an apparatus for controlling placement of a virtual character and a storage medium. The method includes: receiving a first instruction in a virtual reality (VR) scene, the first instruction indicating moving a virtual character from a first position by a designated movement; determining a second position by the designated movement from the first position in response to the first instruction; removing the virtual character from the first position; and placing the virtual character at the second position, the virtual character not appearing between the first position and the second position after being removed from the first position.

An embodiment of the present application further provides an apparatus for controlling placement of a virtual character. The apparatus for controlling placement of a virtual character includes: a processor and a memory connected to the processor, the memory storing machine readable instructions executable by the processor. The processor executing the machine readable instructions to complete the following operations: receiving a first instruction in a virtual reality (VR) scene, the first instruction indicating moving a virtual character from a first position by a designated movement; determining a second position by the designated movement from the first position in response to the first instruction; removing the virtual character from the first position; and placing the virtual character at the second position, the virtual character not appearing between the first position and the second position after being removed from the first position.

An embodiment of the present application further provides a non-volatile computer readable storage medium, the storage medium storing machine readable instructions, and the machine readable instructions being executable by a processor to complete the foregoing method for controlling placement of a virtual character.

BRIEF DESCRIPTION OF THE DRAWINGS

The accompanying drawings shown herein are provided for further understanding of the embodiments of the present application, and constitute a part of the present application, and the exemplary embodiments of the present application and their description are used for explaining the present application, but do not constitute improper limitations to the present application. In the figures.

DESCRIPTION OF EMBODIMENTS

Figure 1:
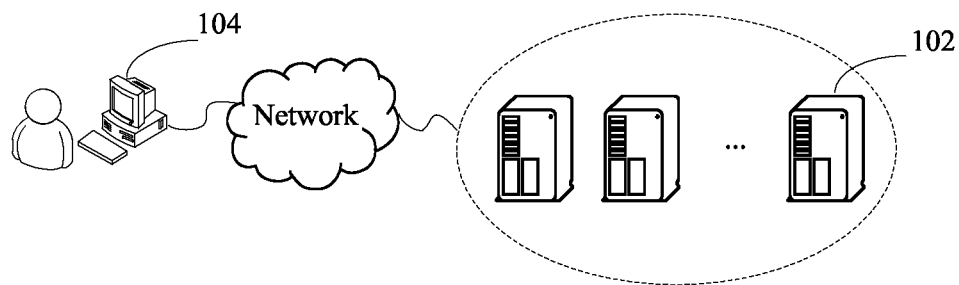
FIG. 1 is a schematic diagram of a hardware environment of a method for controlling placement of a virtual character according to an embodiment of the present application.

To make a person skilled in the art better understand solutions of the present application, the following clearly and completely describes the technical solutions in the embodiments of the present application with reference to the accompanying drawings in the embodiments of the present application. Apparently, the described embodiments are merely some rather than all of the embodiments of the present application. All other embodiments obtained by persons skilled in the art based on the embodiments of the present application without creative efforts shall fall within the protection scope of the present application.

It should be noted that the terms "first" and "second" in the specification, the claims, and the accompanying drawings of the present application are used only to differentiate similar objects, and do not describe a specific relationship or sequence therebetween. It is to be understood that the terms so used are interchangeable under appropriate circumstances such that the embodiments of the present application described herein can be implemented in sequences other than those illustrated or otherwise described herein. Moreover, the terms "include", "comprise", and any variants thereof are intended to cover a non-exclusive inclusion, such that a process, method, system, product, or device that includes a series of steps or units is not necessarily limited to those steps and units expressly listed, but may include other steps or units not expressly listed or inherent to such process, method, product, or device.

In some embodiments, a method for controlling movement of a virtual character in 3D space may be implemented by using three platforms including a personal computer (PC) terminal, a console terminal, and a mobile phone terminal.

A keyboard and a mouse are used by default to perform input operations on a PC terminal. Key control of a virtual character is already highly standardized. Four keys "W", "A", "S", and "D" on the keyboard may be used for moving forward, moving backward, strafing left, and strafing right to perform continuous and linear actions of the virtual character. The front, rear, left, and right of the virtual character are determined according to relative positions of viewpoints of a video camera controlled by the mouse. The mouse is configured to control an orientation of the camera, and the orientation may be any angle.

Each console terminal is provided with a dedicated gamepad. That is, control operations are predefined on each console. Generally, a joystick on the gamepad is configured to control a virtual character to freely move in virtual space. A console terminal and a PC terminal do not have distinctly different operations, and both have continuous movement. Buttons on the console emulate operations of a mouse. The only difference is that a console has customized hardware devices.

Smartphones are fully embracing various games. That is, an increasingly large number of original 3D games are provided on mobile phones. Original physical key operations are turned into virtual key operations on mobile phones. A virtual joystick is configured to control movement of a virtual character or object in 3D space.

A VR terminal provides an omnidirectional 3D perception. That is, instead of converting 3D virtual space into a 2D picture and displaying the 2D picture on a plane, a user is present in the virtual space. At present, VR is generally used in many flight games, shooter games, among others. However, the user feels very dizzy when a visually-induced perception is inconsistent with a perception of the body. Therefore, VR terminals are not suitable for simulation of continuous movement of first-person virtual characters.

HTC Vive on the Vive platform is a VR head-mounted display and is jointly developed by Hongda International Electronics (HTC) and Valve Corporation. This head-mounted display uses "room scale" technology. A room is converted into 3D space by using sensors. A user is allowed to naturally navigate and walk around in a virtual world and use a movement-tracking handheld controller to vividly manipulate an object to implement precise interaction and communication and experience of an immersive environment. A Vive device can track real-world space and further completely map the real-world space to virtual space. Therefore, during the design of many casual games, it is designed that a size of virtual space is close to that of tracking space of Vive. In this way, a user can move completely free in such space. However, the size of simulation space is limited, and different devices can track different sizes of virtual space, resulting in low adaptability to different devices.

In view of this, an embodiment of the present application provides a method for controlling placement of a virtual character.

In some embodiments of the present application, the foregoing method for controlling placement of a virtual character may be applied to a hardware environment that includes a server 102 and a terminal 104 shown in FIG. 1. FIG. 1 is a schematic diagram of the hardware environment of the method for controlling placement of a virtual character according to an embodiment of the present application. As shown in FIG. 1, the server 102 is connected to the terminal 104 via a network. The network includes, but is not limited to, a wide area network, a metropolitan area network or a local area network. The terminal 104 is not limited to a PC, a mobile phone, and a tablet computer. The method for controlling placement of a virtual character in this embodiment of the present application may be performed by a computing device, for example, the server 102, or may be performed by the terminal 104, or may be jointly performed by the server 102 and the terminal 104. When the terminal 104 performs the method for controlling placement of a virtual character in this embodiment of the present application, the method may be performed by a client installed on the terminal 104.

Figure 2:
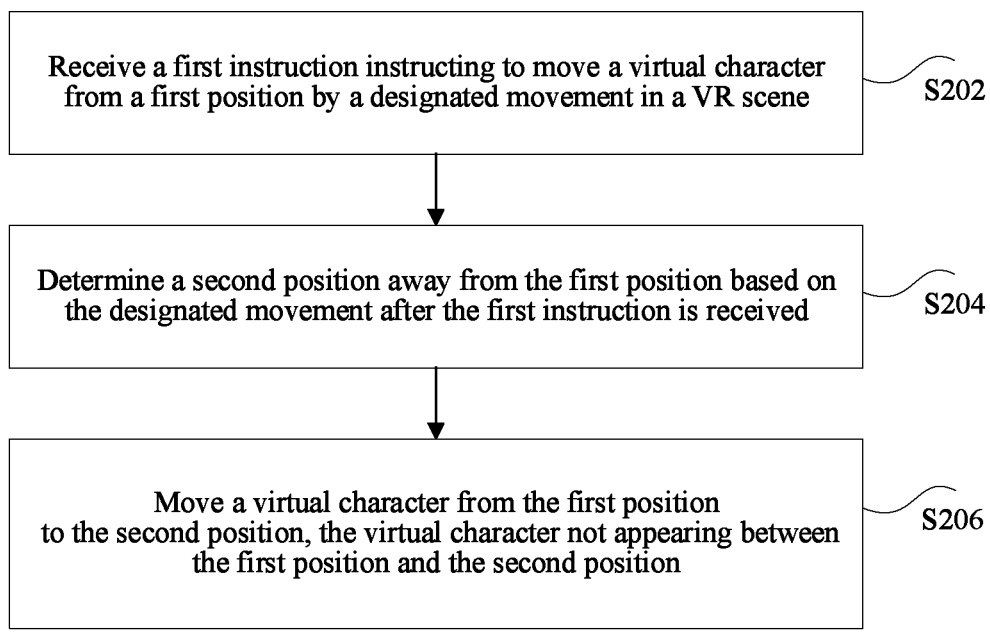
FIG. 2 is a flowchart of a method for controlling placement of a virtual character according to an embodiment of the present application.

FIG. 2 is a flowchart of a method for controlling placement of a virtual character according to an embodiment of the present application. The method may be applied to a computing device. As shown in FIG. 2, the method may include the following steps:

Step S202: Receive a first instruction used for instructing the computing device to generate a designated movement of a virtual character from a first position in a VR scene.

In the technical solution provided by step S202 of the present application, the first instruction used for instructing the virtual character to generate the designated movement from the first position is received in the VR scene.

In VR, that is, a virtual scene or a virtual environment, a virtualization technology is used and latest developments of technologies such as computer graphics, computer simulation, artificial intelligence, sensing, display, and network parallel processing are integrated to provide a high-tech simulated system generated with the assistance of computer technologies. A virtual world of 3D space is generated through computer simulation to provide a user with a simulated environment involving visual perception and the like, so that the user observes an object in the 3D space in time in an unlimited manner and enjoys immersive experience. When the virtual character representing the user moves in the virtual environment, a computer may immediately perform complex operation on information of the virtual character and feedback precise 3D space in a video form, so that the user can have the sensation of presence.

The VR scene in this embodiment is a scene that is obtained by simulating a real-world scene by using a VR technology and is applicable to a specific application. For example, the VR scene is a scene that is obtained by completely mapping real-world space to virtual space by using the VR technology and is applicable to a game application. The game application is a VR game application, and is an application showing a process of controlling placement of the virtual character in some embodiments of the present application. In the VR scene, the user is mapped to the virtual character. In some embodiments of the present application, operations of the user are mapped to actions of the virtual character. For example, the user pushes a joystick of a VR device in any direction, and a placement selection mechanism of the virtual character is triggered. When the user releases the joystick, the placement selection mechanism of the virtual character is canceled. In addition, the VR scene may provide the user with a simulated scene involving visual perception and the like, so that the user can use the virtual character to observe an object in the scene in time in an unlimited manner, and the user has the sensation of presence in the real-world scene.

According to some embodiments of the present application, for example, in the VR scene: a change process of placement of the virtual character may be implemented; an area accessible to the virtual character may be determined, for example, a valid area in which the virtual character is allowed to move is determined; an operation performed by the virtual character may be determined, for example, a type of a skill that the virtual character is allowed to use during a fight is determined; and attributes possessed by the virtual character may be assigned, for example, the level of difficulty that the health of the virtual character is regenerated or depleted. This is not limited herein.

According to some embodiments of the present application, the VR scene is a large-scale online multiplayer scene. That is, the VR scene includes a plurality of online virtual characters. A user corresponding to each virtual character may learn about a change process of an action of a virtual character corresponding to another user, for example, learn about the change process of placement of the virtual character corresponding to another user.

It should be noted that the foregoing VR scene is only a preferred implementation in this embodiment of the present application, and it does not mean that the VR scene in this embodiment of the present application is only limited to the foregoing manners. Any VR scene in which the method for controlling placement of a virtual character can be implemented and a user can be prevented from easily feeling dizzy because of continuous movement of a virtual character falls within the protection scope of the present application. Examples are not enumerated herein again.

The virtual character in this embodiment moves in the VR scene, placement of the virtual character may be controlled. A placement mechanism of the virtual character is first triggered. That is, the placement selection mechanism of the virtual character in the VR scene is started, and the first instruction used for instructing the virtual character to generate the designated movement from the first position is received. That is, the designated movement by which the virtual character is to move in the VR scene is selected. It is convenient and flexible to trigger the first instruction. The first position is a starting place of the virtual character in the VR scene before movement, and includes an initial position and an initial orientation in the VR scene. The orientation is a direction in which the virtual character moves.

According to some embodiments of the present application, the first instruction is generated based on a physical gamepad. The joystick may be pushed in any direction to trigger selection of the designated movement, or a touchpad may be pressed at any position to trigger selection of the designated movement, so as to select a unique orientation of the virtual character. According to some embodiments of the present application, physical keys for precisely controlling directions may be used. For example, the joystick and the touchpad are used.

According to some embodiments of the present application, the joystick is pushed in any direction to trigger selection of a placement position on the Oculus platform. The touchpad is pressed at any position to trigger selection of the designated movement on the Vive platform. Oculus Rift on the Oculus platform is a VR head-mounted display, and used software is mainly electronic games and uses programming customized for Rift.

Step S204: Determine a second position away from the first position based on the designated movement after the first instruction is received.

In the technical solution provided by step S204 of the present application, the second position away from the first position by the designated movement is determined after the first instruction is received.

The second position away from the first position by the designated movement is determined after the first instruction is received. The second position is a place to which the virtual character is to move in VR space. When the joystick is pressed or the touchpad is released from pressing, a placement determination mechanism is triggered. That is, it is triggered that the virtual character needs to move. Specifically, how to determine the second position away from the first position by the designated movement is described in detail in the following embodiments.

According to some embodiments of the present application, because it is convenient and flexible to trigger the first instruction, placement may be triggered by mistake in a placement triggering mechanism. Therefore, the embodiment may further provide a placement cancellation mechanism in which the joystick may be released, or a large circular touchpad may be lifted to cancel the determined designated movement. For example, the user may release the joystick to cancel the selected designated movement on the Oculus platform, the user may lift the touchpad to cancel the selected designated movement on the Vive platform, and the subsequent placement selection mechanism is not triggered.

According to some embodiments of the present application, the designated movement may be previewed after the designated movement is determined. For example, a curve is used for previewing the determined designated movement. A time of an extending process of the curve is a buffering time for determining placement. When placement is triggered by mistake, the user may cancel the determined placement in time. A presented special effect of the curve in the VR scene is slowly projecting a ray from a position of a hand towards the right front of the gamepad. For example, a curve with an arrow is slowly produced. It takes approximately one second for the curve to bend and extend to the ground, so that the head of the curve is used for representing the position of the second position.

According to some embodiments of the present application, on the Oculus platform, a complete operation procedure of the user is pushing the joystick to trigger the placement selection mechanism, then adjusting a spatial position and direction of a hand of the user to determine a position of the designated movement, then adjusting a direction of the joystick to determine a direction of the designated movement, and finally pressing the joystick to confirm that the designated movement is started; and on the Vive platform, a complete operation procedure of the user is pressing the touchpad to trigger the placement selection mechanism, then adjusting a spatial position and direction of a hand of the user to determine a position of the designated movement, then adjusting a position of a touch point of the hand to determine a direction of the designated movement, and finally lifting the hand to leave the touchpad to confirm that the designated movement is started. Therefore, the operations of determining the designated movement are simple, convenient, and fast.

Step S206: Removing the virtual character from the first position and control the virtual character to appear at the second position. The virtual character does not appeared between the first position and the second position during this movement.

In the technical solution provided by step S206 of the present application, the virtual character is controlled to disappear from the first position and the virtual character is controlled to appear at the second position, where the virtual character has not appeared between the first position and the second position.

The virtual character is controlled to disappear from the first position and the virtual character is controlled to appear at the second position after the second position away from the first position by the designated movement is determined. For the user, the virtual character is kept still at the first position, that is, stays in a static state. A camera slowly cuts to black. Next, when the camera restores display, the virtual character is switched to a position and an orientation indicated by the second position. As the camera slowly restores display, the position and orientation of the virtual character that are indicated by the second position do not change, that is, the virtual character also stays in a static state. As the virtual character disappears from the first position and appears at the second position, the virtual character has not appeared between the first position and the second position. In this way, the virtual character is teleported in the VR scene. The user does not feel the acceleration and speed from continuous movement, and teleportation is implemented to avoid continuous movement, thereby preventing dizziness and improving user experience.

For other users in the VR scene, for sudden disappearance from the first position and sudden appearance at the second position, special effects of whirling dots may simultaneously appear at the first position and the second position, the dots at the first position are deflected towards the second position during disturbance like being blown by wind. That is, particle wind is generated to indicate occurrences at the first place and the second position to the other users. A direction of the particle wind is used for indicating an origin and a destination of a change process of placement of the current virtual character in the VR scene to the other users, to enable the other users in the VR scene to clearly see a placement process of the virtual character, so that an operation method adapts to various hardware specifications, operations are simple and convenient and can be easily learned, and desirable performance is achieved in a large-scale multiplayer real-time online VR scene.

In step S202 to step S206, the first instruction used for instructing the virtual character to generate the designated movement from the first position is received in the VR scene; the second position away from the first position by the designated movement is determined after the first instruction is received; and the virtual character is controlled to disappear from the first position and the virtual character is controlled to appear at the second position, the virtual character having not appeared between the first position and the second position. That is, the virtual character is controlled to disappear from the first position and the virtual character is controlled to appear at the second position in the VR scene, so that the virtual character is teleported to avoid continuous movement, and a technical effect of preventing a user from easily feeling dizzy because of continuous movement of a virtual character is achieved, thereby resolving a technical problem in related technologies that a user easily feels dizzy because of continuous movement of a virtual character.

In some other embodiments of the present application, step S206 of controlling the virtual character to disappear from the first position and controlling the virtual character to appear at the second position includes: controlling the virtual character to stay at the first position and controlling a viewer to cut to black after the second position is determined; and controlling the viewer to restore display and controlling the virtual character to stay at the second position after the viewer is controlled to cut to black. The viewer may be any type of the VR/AR viewer, such as a camera or a display screen.

Figure 3:
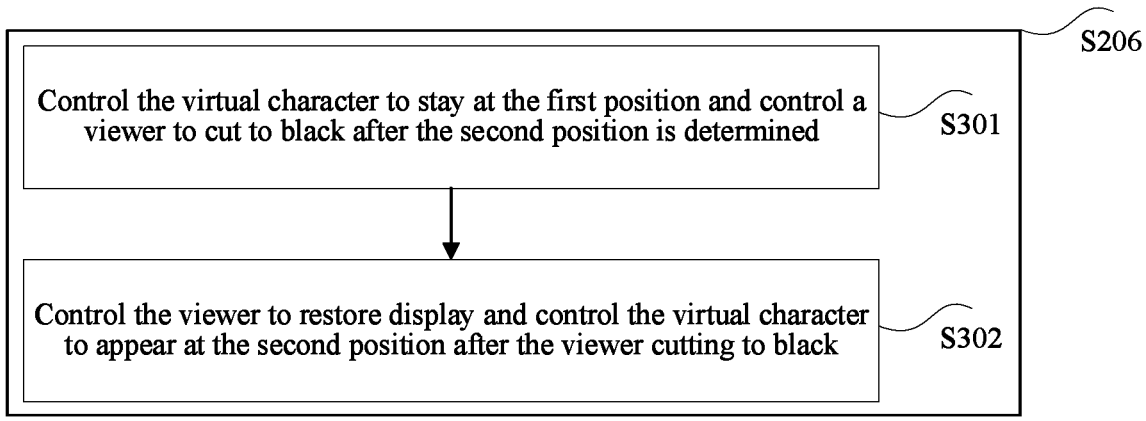
FIG. 3 is a flowchart of a method for controlling a virtual character to disappear from a first place and controlling the virtual character to appear at a second position according to an embodiment of the present application.

FIG. 3 is a flowchart of a method for controlling the virtual character to disappear from the first position and controlling the virtual character to appear at the second position according to an embodiment of the present application. As shown in FIG. 3, the method includes the following steps:

Step S301: Keep the virtual character at the first position and control the viewer to cut to black after the second position is determined.

In the technical solution provided by step S301 of the present application, the virtual character is controlled to stay at the first position and the viewer is controlled to cut to black after the second position is determined, where the viewer is used for displaying a picture of the VR scene.

The first position is an initial position of the virtual character in the VR scene before movement. The virtual character is controlled to stay at the first position after the second position away from the first position by the designated movement is determined. That is, the virtual character is controlled to stay still at the first position, and the viewer cuts to black, so that the virtual character disappears from the first position. The viewer is used for displaying the picture of the VR scene. That is, the picture of the VR scene is a picture seen by the user corresponding to the virtual character in the VR scene.

In this embodiment, the virtual character is controlled to stay at the first position and the viewer is controlled to cut to black to implement a display effect of sudden disappearance of the virtual character from the first position.

Step S302: Control the viewer to restore display and control the virtual character to be placed at the second position after the viewer is controlled to cut to black.

In the technical solution provided by step S302 of the present application, the viewer is controlled to restore display and the virtual character is controlled to stay at the second position after the viewer is controlled to cut to black.

The viewer is controlled to restore display of the picture after the virtual character is controlled to stay at the first position and the viewer is controlled to cut to black. That is, the viewer is no longer black. At this time, the virtual character stays at the second position in the VR scene. The second position is a latest place that the virtual character reaches and is away from the first position by the designated movement. The designated movement is determined by the placement selection mechanism. The virtual character has not appeared between the first position and the second position, so as to prevent the user corresponding to the virtual character from feeling dizzy because of continuous movement of the virtual character in the VR scene.

In this embodiment, the viewer is controlled to restore display and the virtual character is controlled to stay at the second position to implement a visual effect of sudden appearance of the virtual character at a new position.

In this embodiment, the virtual character is controlled to stay at the first position and the viewer is controlled to cut to black after the second position is determined, where the viewer is used for displaying the picture of the VR scene; and the viewer is controlled to restore display and the virtual character is controlled to stay at the second position after the viewer is controlled to cut to black, so that the virtual character is controlled to disappear from the first position and the virtual character is controlled to appear at the second position, thereby achieving a technical effect of preventing the user from feeling dizzy because of continuous movement of the virtual character.

In some other embodiments of the present application, step S301 of controlling the viewer to cut to black includes: controlling the viewer to gradually cut to black, where the virtual character is kept at the first position as the viewer gradually cuts to black; and step S302 of controlling the viewer to restore display includes: controlling the viewer to gradually restore display, where the virtual character is kept at the second position as the viewer gradually restores display.

When the viewer is controlled to cut to black, the viewer is controlled to gradually cut to black. That is, the viewer slowly cuts to black when the virtual character is controlled to stay at the first position, so that the virtual character disappears from the first position in the VR scene. The viewer is controlled to gradually restore display when the viewer is controlled to restore display. That is, the viewer slowly restores display of the picture of the VR scene. As the viewer slowly restores display, the position and orientation of the virtual character at the second position are kept unchanged. That is, the virtual character is kept in a static state. In such a process in which the viewer gradually cuts to black and a process in which the viewer gradually restores display, the user corresponding to the virtual character does not feel the acceleration and speed from continuous movement during placement, and the user does not feel dizzy accordingly, thereby improving user experience.

In some other embodiments of the present application, step S206 of controlling the virtual character to disappear from the first position and controlling the virtual character to appear at the second position includes: controlling the virtual character to disappear from the first position, and displaying first indication information at the first position after the second position is determined; and controlling the virtual character to appear at the second position, and displaying second indication information at the second position.

Figure 4:
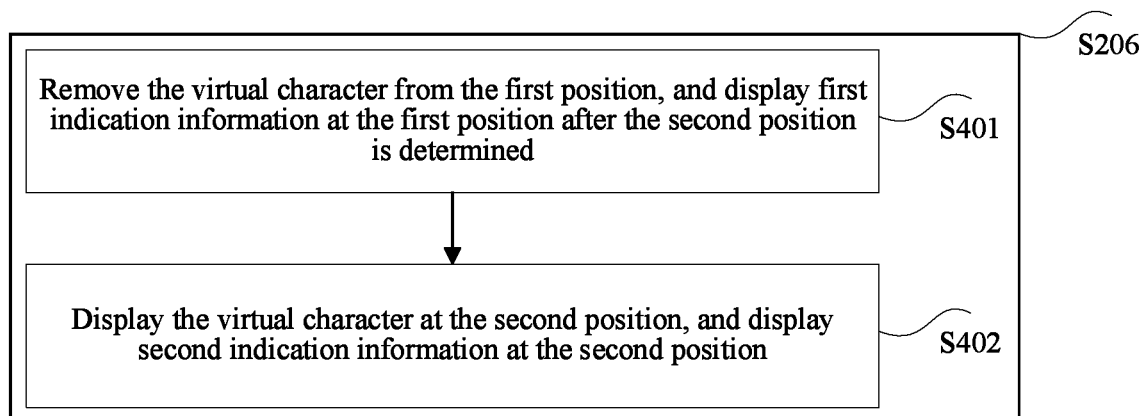
FIG. 4 is another flowchart of a method for controlling a virtual character to disappear from a first place and controlling the virtual character to appear at a second position according to an embodiment of the present application.

FIG. 4 is another flowchart of a method for controlling the virtual character to disappear from the first position and controlling the virtual character to appear at the second position according to an embodiment of the present application. As shown in FIG. 4, the method includes the following steps:

Step S401: Remove the virtual character from the first position, and display the first indication information at the first position after the second position is determined.

In the technical solution provided by step S401 of the present application, the virtual character is controlled to disappear from the first position and the first indication information is displayed at the first position after the second position is determined, where the first indication information is used for indicating the occurrence at the first position in the VR scene.

The first indication information is displayed at the first position when the virtual character is controlled to disappear from the first position after the second position away from the first position by the designated movement is determined. The first indication information may be dots, that is, disappearance dots indicating that the virtual character is about to disappear from the first position. According to some embodiments of the present application, the special effect of whirling dots is presented within a preset range of the first position and is used for indicating the occurrence at the first position in the VR scene, so as to remind the user of the occurrence.

Step S402: Display the virtual character to appear at the second position, and display the second indication information at the second position.

In the technical solution provided by step S402 of the present application, the virtual character is controlled to appear at the second position, and the second indication information is displayed at the second position, where the second indication information is used for indicating the occurrence at the second position in the VR scene.

The virtual character is controlled to appear at the second position and simultaneously the second indication information is displayed at the second position after the virtual character is controlled to disappear from the first position. The second indication information may be dots, that is, appearance dots indicating that the virtual character is about to appear at the second position. According to some embodiments of the present application, the special effect of whirling dots is presented within a preset range of the second position and is used for indicating the occurrence at the second position in the VR scene.

In this embodiment, the virtual character is controlled to disappear from the first position and the first indication information is displayed at the first position after the second position is determined, where the first indication information is used for indicating the occurrence at the first position in the VR scene; and controlling the virtual character to appear at the second position, and displaying the second indication information at the second position, where the second indication information is used for indicating the occurrence at the second position in the VR scene, so that the virtual character is controlled to disappear from the first position and the virtual character is controlled to appear at the second position.

In some other embodiments of the present application, step S401 of displaying first indication information at the first position includes: displaying a moving first dot at the first position, where the first indication information includes the moving first dot; and step S402 of displaying the second indication information at the second position includes: displaying a moving second dot at the second position, where the second indication information includes the moving second dot, and a moving direction from the first dot to the second dot is used for representing a change process of the virtual character from the first position to the second position.

In this embodiment, for other users in the VR scene, the moving first dot is displayed at the first position when the first indication information is displayed at the first position. The first dot may include a plurality of small particles. The plurality of small particles whirl around to indicate the occurrence at the first position in the VR scene to the other users or may represent that the place in the VR scene is a position of the virtual character before movement. When the virtual character is controlled to appear at the second position and the second indication information is displayed at the second position, the moving second dot is displayed at the second position to indicate the occurrence at the second position in the VR scene to the other users or may represent that the place in the VR scene is a position of the virtual character after movement. According to some embodiments of the present application, the second dot is different from the first dot. For example, a quantity of dots included by the second dot is different from a quantity of dots included by the first dot, and/or a size of a dot included by the second dot is different from a size of a dot included by the first dot.

The moving direction from the first dot to the second dot is used for representing the change process from the first position to the second position. The first dot may be deflected towards the second position during disturbance to obtain the second dot. A special effect presented in the change process from the first dot to the second dot is particle wind having an effect of wind blowing through. The direction of the particle wind is used for indicating, to the other users in the VR scene, that the change process of placement of the virtual character is the change process from the first position to the second position. Such a placement presentation process enables other users in the VR scene to learn about the change process of placement of the virtual character and is applicable to a large-scale multiplayer scene.

It should be noted that presented special effects of the first indication information and the second indication information are only preferred implementations of this embodiment of the present application, but it does not mean a presented special effect in this embodiment of the present application is only a presented special effect of particles. Other methods that may be used for indicating to the user that the change process of placement of the virtual character is the change process from the first position to the second position all fall within the protection scope of the present application. Examples are not enumerated herein again.

In some other embodiments of the present application, before step S204 of determining a second position away from the first position by the designated movement, the method includes: displaying third indication information used for indicating the designated movement; and step S204 of determining a second position away from the first position by the designated movement includes: determining the second position according to the third indication information.

Because the placement triggering mechanism of the virtual character is convenient and flexible, that is, placement may be triggered by mistake during selection of the designated movement, it is necessary to provide the user with the buffering time, that is, a hesitation time, and the user may cancel, within the buffering time, the placement that is triggered by mistake. In this embodiment, the buffering time for the user to determine placement is provided before the second position away from the first position by the designated movement is determined. The third indication information used for indicating the designated movement is displayed after the placement selection mechanism is triggered. The third indication information may be presented by using a special effect to preview a selection result of the designated movement. The second position is determined according to the third indication information. For example, the position and orientation of the second position in the VR scene are determined according to the third indication information.

In some other embodiments of the present application, the displaying third indication information used for indicating the designated movement includes: displaying a curve used for indicating the designated movement, where the third indication information includes the curve.

A special effect presentation form of the third indication information may be slowly projecting a ray from the position of the hand of the user towards the right front of the gamepad when the third indication information used for indicating the designated movement is displayed. For example, the ray is a blue curve with an arrow. After a particular period of time, the curve bends and extends to the ground. According to some embodiments of the present application, it takes approximately one second for the curve to bend and extend to the ground. A presented special effect, for example, a cylinder shown at the end of the curve shown in FIG. 8, of the new position indicated by the head of the curve appears. The time of the extending process of the blue curve is the buffering time of the user. The user releases a joystick on the Oculus platform, and the user lifts a large circular touchpad on the Vive platform, so that the placement selection mechanism is canceled, and the subsequent placement mechanism is not triggered.

In some other embodiments of the present application, the determining the second position according to the third indication information includes: determining an intersection position of the curve and a preset plane; and determining an area within a preset distance range away from the intersection position as a position indicated by the second position.

Figure 5:
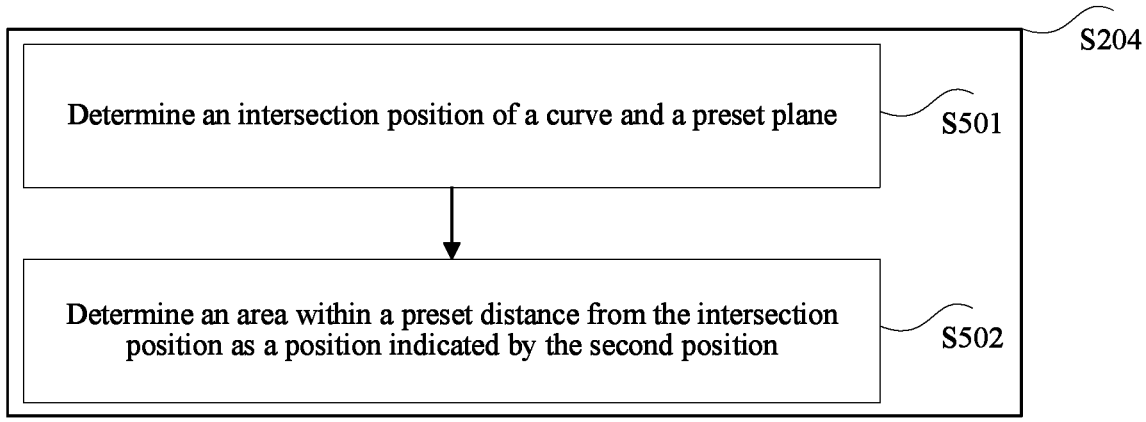
FIG. 5 is a flowchart of a method for determining a second position away from a first position by designated movement according to an embodiment of the present application.

FIG. 5 is a flowchart of a method for determining the second position away from the first position by the designated movement according to an embodiment of the present application. As shown in FIG. 5, the method includes the following steps:

Step S501: Determine the intersection position of the curve and the preset plane.

In the technical solution provided by step S501 of the present application, the intersection position of the curve and the preset plane is determined, where the preset plane is used for supporting the virtual character.

The second position includes a final position and orientation of the virtual character in the VR scene. The position and orientation that are indicated by the second position are determined when the second position away from the first position by the designated movement is determined. The intersection position of the curve and the preset plane is determined, and the end of the curve may be represented by the cylinder. A special effect of the cylinder is used for presenting a position and an orientation of the user after movement.

According to some embodiments of the present application, the position indicated by the second position is an intersection position of the preset plane and a parabola that is drawn from the right front of the hand of the user at a particular speed. The preset plane may be a position such as the ground or a mountain that is used for supporting the virtual character in the VR scene. This is not limited herein.

Step S502: Determine the area within the preset distance from the intersection position as the position indicated by the second position.

In the technical solution provided by step S502 of the present application, the area within the preset distance range away from the intersection position is determined as the position indicated by the second position.

The area within the preset distance range away from the intersection position is determined as the position indicated by the second position after the intersection position of the curve and the preset plane is determined, so that the position indicated by the second position is determined.

In this embodiment, the intersection position of the curve and the preset plane is determined; and the area within the preset distance range away from the intersection position is determined as the position indicated by the second position, so that the second position away from the first position by the designated movement is determined. Further, the virtual character is controlled to disappear from the first position and the virtual character is controlled to appear at the second position. A technical effect of preventing a user from easily feeling dizzy because of continuous movement of a virtual character is achieved.

In some other embodiments of the present application, step S502 of determining the area within the preset distance range away from the intersection position as the position indicated by the second position includes: detecting whether the second position is valid in the VR scene; and determining the area within the preset distance range away from the intersection position as the position indicated by the second position if it is detected that the second position is valid in the VR scene.

Figure 6:
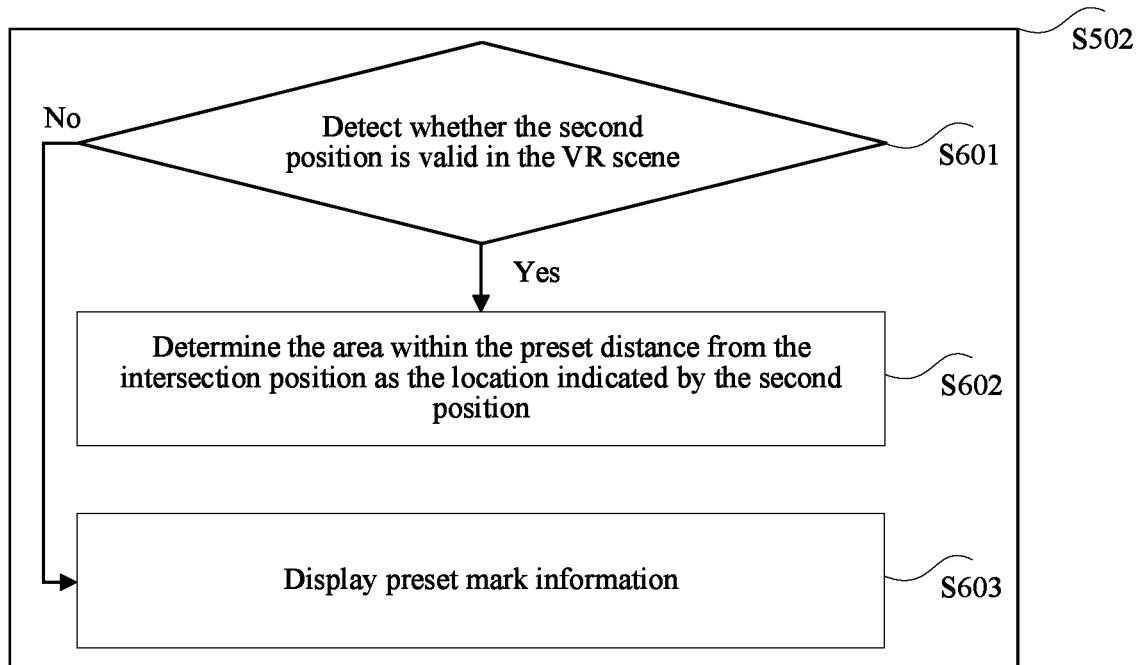
FIG. 6 is a flowchart of a method for determining an area within a preset distance range away from an intersection position as a position indicated by a second position according to an embodiment of the present application.

FIG. 6 is a flowchart of a method for determining the area within the preset distance range away from the intersection position as the position indicated by the second position according to an embodiment of the present application. As shown in FIG. 6, the method includes the following steps:

Step S601: Detect whether the second position is valid in the VR scene.

In the technical solution provided by step S601 of the present application, it is detected whether the second position is valid in the VR scene.

A concept of an invalid teleportation area is introduced in this embodiment. Some virtual areas in the VR scene are inaccessible to the virtual character. However, the parabola produced by the hand of the user can reach any virtual area in the VR scene. Therefore, a virtual area needs to be restricted. To detect whether the second position is valid in the VR scene is to detect whether the second position is a virtual area accessible to the virtual character. If it is detected that the second position is a virtual area accessible to the virtual character, it is determined that the second position is valid in the VR scene. If it is detected that the second position is a virtual area inaccessible to the virtual character, it is determined that the second position is not valid in the VR scene.

Step S602: Determine the area within the preset distance from the intersection position as the position indicated by the second position if the second position is valid in the VR scene.

In the technical solution provided by step S602 of the present application, the area within the preset distance from the intersection position is determined the position indicated by the second position if it is detected that the second position is valid in the VR scene.

The system detects whether the second position is valid in the VR scene. The area within the preset distance range away from the intersection position is determined as the position indicated by the second position if it is detected that the second position is valid in the VR scene, so that the position indicated by the second position is determined, the virtual character is controlled to disappear from the first position, and the virtual character is controlled to appear at the second position. A technical effect of preventing the user from easily feeling dizzy because of continuous movement of a virtual character is achieved.

Step S603: Display preset mark information if it is detected that the second position is not valid in the VR scene.

In the technical solution provided by step S603 of the present application, the preset mark information is displayed if it is detected that the second position is not valid in the VR scene, where the preset mark information is used for indicating that the second position is not valid in the VR scene.

In this embodiment, an accessible area in a virtual scene is marked. If the system detects that the second position is not valid in the VR scene, that is, the second position is an inaccessible area in the VR scene. That is, when the parabola line intersects with the second position, because the second position is inaccessible to the virtual character, the system may display special effects of both the curve and the position indicated by the second position by a distinctive color, for example, red, so as to remind the user that the virtual character cannot be teleported to the second position. At this time, if the user presses the joystick or lifts a large circular touchpad, placement selection may be canceled, and a placement presentation scene is not triggered.

In some other embodiments of the present application, after the displaying third indication information used for indicating the designated movement, the method further includes: receiving a second instruction, where the second instruction is used for instructing to cancel placement of the virtual character from the first position, and the placement includes the designated movement; and controlling the virtual character to cancel the designated movement from the first position after the second instruction is received.

Because the placement triggering mechanism is very convenient and flexible, the second instruction is generated when the user releases the joystick or lifts the large circular touchpad, and the placement determination mechanism is triggered. The user releases a joystick on the Oculus platform, and the user lifts a large circular touchpad on the Vive platform, so that the second instruction is generated, the placement selection mechanism is canceled according to the second instruction, and the subsequent placement mechanism is not triggered.

In some other embodiments of the present application, the determining a second position away from the first position by the designated movement includes: receiving a third instruction, where the third instruction is used for indicating a position indicated by the second position; and determining the position indicated by the second position after the third instruction is received.

The third instruction is generated by using an operation of the user when the second position away from the first position by the designated movement is determined, and the third instruction is received to indicate the position of the second position, so as to determine the position of the second position.

In some other embodiments of the present application, the receiving a third instruction includes: acquiring position information of a first operating object in a real-world scene, where the first operating object is configured to adjust the position indicated by the second position, and the position information corresponds to the position indicated by the second position; and acquiring the third instruction according to the position information.

The first operating object may be the hand of the user. The user may simply change the position of the hand, the third instruction may be received by rotating an angle of the right front of the hand, and the position of the designated movement may be radically adjusted according to the third instruction.

In some other embodiments of the present application, the determining a second position away from the first position by the designated movement includes: receiving a fourth instruction, where the fourth instruction is used for indicating an orientation indicated by the second position; and determining the orientation indicated by the second position after the fourth instruction is received.

The fourth instruction is generated by using an operation of the user when the second position away from the first position by the designated movement is determined, and the fourth instruction is received to indicate the orientation of the second position, so as to determine the orientation of the second position.

In some other embodiments of the present application, the receiving a fourth instruction includes: acquiring angle information of a second operating object in a real-world scene, where the second operating object is configured to adjust the orientation indicated by the second position, and the angle information corresponds to the orientation indicated by the second position; and acquiring the fourth instruction according to the angle information.

The second operating object may be the gamepad. A direction selection mechanism of the gamepad may be used for determining the angle information. On the Oculus platform, 360-degree directions of the joystick are mapped to horizontal 360-degree directions of the position indicated by the second position. Therefore, the user only needs to very conveniently rotate the joystick to a direction to determine the orientation indicated by the second position. According to some embodiments of the present application, an arrow provided at the end of the curve is used for presenting the second position of the virtual character in the VR scene, so as to visually present the designated movement and determine the position and orientation of the virtual character after movement by the designated movement.

In some other embodiments of the present application, the receiving a first instruction used for instructing to generate the designated movement of a virtual character from a first position includes: receiving the first instruction by using a joystick; and the determining a second position away from the first position by the designated movement includes: determining the second position by using the joystick; or, the receiving a first instruction used for instructing to generate the designated movement of a virtual character from a first position includes: receiving the first instruction by using a touchpad; and the determining a second position away from the first position by the designated movement includes: determining the second position by using the touchpad.

The implementation of this embodiment is compatible to two current commercially available mainstream headsets Oculus and Vive and corresponding operation gamepads. If a new hardware device emerges, the operations in this embodiment are also applicable.

This embodiment provides a method for controlling placement of a virtual character in a VR scene. Operations of a user are simple, convenient, and intuitive. A previewing effect during placement selection may very intuitively inform the user of a result of an operation of the user. A virtual character is teleported to prevent the user from feeling dizzy because of continuous movement in the VR scene. A direction special effect is used for enabling other users in the scene to clearly see a placement process of the virtual character, so that an operation method adapts to various hardware specifications, operations are simple and convenient and can be easily learned, and desirable performance is achieved in a large-scale multiplayer real-time online scene.

The technical solutions of the present application are described below with reference to the embodiments, and mainly a logic control procedure of controlling placement of a virtual character on a program level is described.

Figure 7:
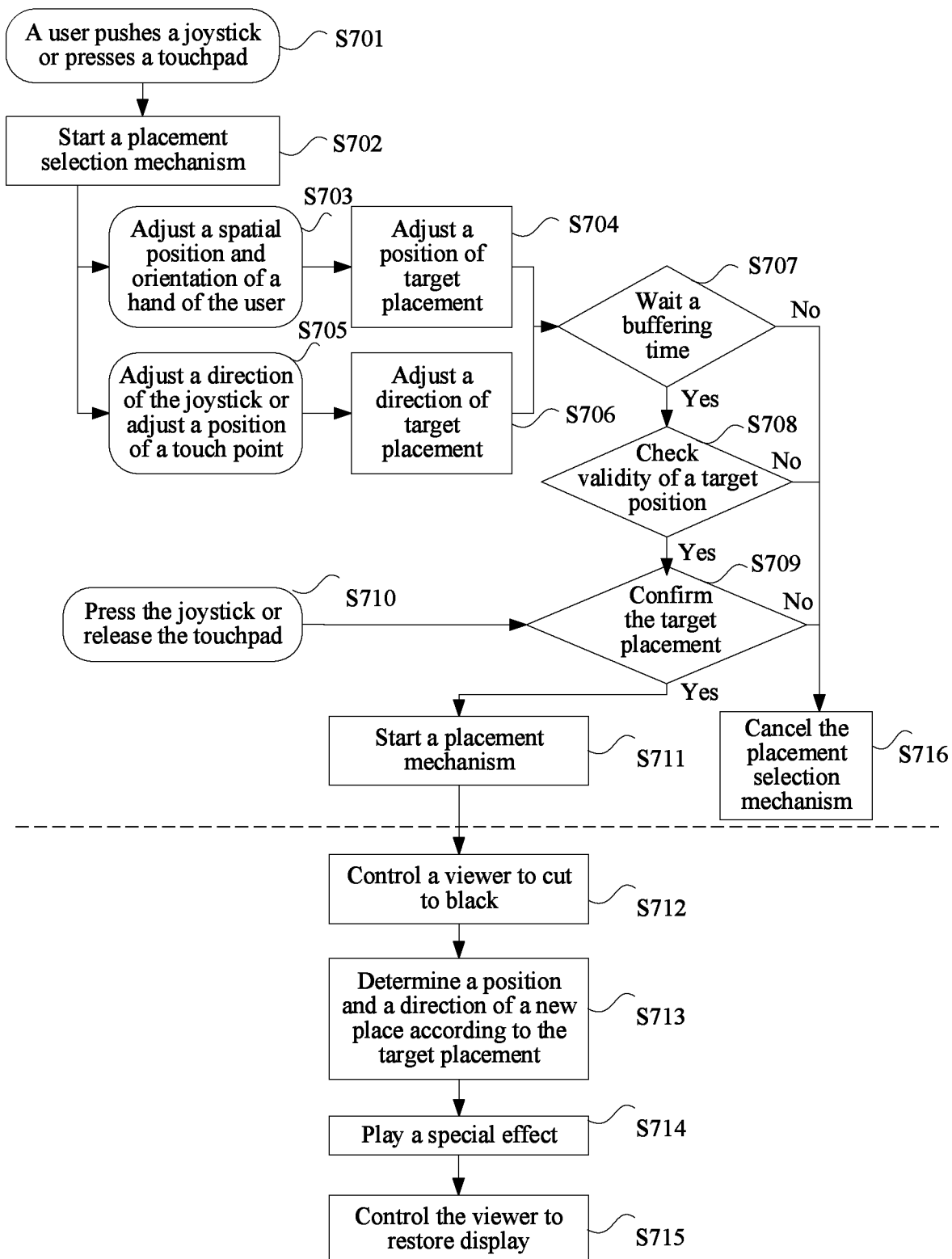
FIG. 7 is a flowchart of another method for controlling placement of a virtual character according to an embodiment of the present application.

FIG. 7 is a flowchart of another method for controlling placement of a virtual character according to an embodiment of the present application. As shown in FIG. 7, a rounded rectangle is used for representing a user input, a standard rectangle is used for representing a logic unit, a rhombus is used for representing control flow selection, and a dashed line is used for separating implementation logic of a placement selection process and a placement presentation process. The method includes the following steps:

Step S701: A user pushes a joystick or presses a touchpad.

During control of placement of a virtual character, first, in a placement triggering mechanism, the user pushes the joystick or presses the touchpad. The placement triggering mechanism is based on a physical gamepad. Placement triggering mechanisms on different platforms are slightly different. The joystick is pushed in any direction to trigger selection of a placement position on the Oculus platform. The touchpad is pressed at any position to trigger selection of placement on the Vive platform. The Oculus platform and the Vive platform have rather different physical keys but have a consistent design concept. That is, because an orientation of placement needs to be selected, physical keys for precisely controlling directions of placement are required, and the joystick and the touchpad are the best choices.

Step S702: Start a placement selection mechanism.

The placement selection mechanism is started after the user pushes the joystick or presses the touchpad.

Step S703: Adjust a spatial position and orientation of a hand of the user.

The spatial position and orientation of the hand of the user are adjusted after the placement selection mechanism is started. The user may simply move the spatial position of the hand and rotate the angle of the right front of the hand to adjust the spatial orientation of the hand.

Step S704: Adjust a position of designated movement.

The spatial position and orientation of the hand of the user are adjusted to radically adjust the position of the designated movement.

Step S705: Adjust a direction of the joystick or adjust a position of the touch point.

A direction selection mechanism of the gamepad is used for determining an angle after the placement selection mechanism is started. For example, on the Oculus platform, 360-degree directions of the joystick are mapped to horizontal 360-degree directions of a target position. Therefore, the user only needs to rotate the joystick to a direction to very conveniently determine a target rotation position, so as to determine a direction of the designated movement. Alternatively, the position of the touch point on the touchpad is adjusted to determine the direction of the designated movement.

Step S706: Adjust the direction of the designated movement.

The direction of the designated movement is adjusted after the direction of the joystick is adjusted or the position of the touch point is adjusted.

Step S707: Wait a buffering time.

In this embodiment, the placement triggering mechanism is very convenient and flexible. However, placement may be triggered by mistake in this embodiment. Therefore, a cancellation mechanism for canceling the designated movement is required. The buffering time is waited after the position of the designated movement and the direction of the designated movement are adjusted, so as to provide a hesitation time to the user during placement selection. According to some embodiments of the present application, a ray is slowly projected from the position of the hand of the user towards the right front of the gamepad. For example, a blue curve with an arrow is slowly discharged, and the blue curve may also be referred to as a parabola. It takes approximately one second for the curve to bend and extend to the ground. A presented special effect (a cylinder shown at the end of the curve shown in FIG. 8) of a new position indicated by the head of the curve appears. An extending process of the curve provides the user with the hesitation time, that is, the buffering time.

For example, the user releases the joystick on the Oculus platform, and the user lifts the large circular touchpad on the Vive platform, so that the placement selection mechanism is canceled, and a subsequent placement mechanism is not triggered. If the curve extends till a presented special effect appears at the position of the end of the curve, it represents that a placement presented special effect is triggered.

If the buffering time ends, that is, the curve bends and extends to the ground and a presented special effect of the new position indicated by the head of the curve appears, step S708 is performed. If the buffering time does not end, that is, the curve does not bend and extend to the ground and a presented special effect does not appear at the new position indicated by the head of the curve, for example, a user of Oculus releases the joystick or a user of Vive lifts the large circular touchpad, step S716 is performed.

Step S708: Check validity of the target position.

The validity of the target position of the designated movement is checked after the buffering time ends. Some virtual areas in a VR scene are set to be inaccessible to the virtual character. However, the parabola produced by the hand of the user can reach any virtual area. Therefore, a virtual area needs to be restricted.

According to some embodiments of the present application, a position accessible to the virtual character in the VR scene is marked. The drawn parabola may intersect with an inaccessible area, because the virtual character cannot reach the inaccessible area, special effects of both the parabola and the target position may be set to a red color to remind the user that the virtual character cannot be teleported to the target position. At this time, if the user presses the joystick or lifts the large circular touchpad, placement selection is canceled, and placement presentation is not triggered. If it is found through checking that the target position is valid, step S709 is performed. If it is found through checking that the target position is not valid, step S716 is performed.

Step S709: Confirm the designated movement.

After the validity of the target position is checked, if it is found through checking that the target position is valid, the designated movement is to be confirmed. If the designated movement is confirmed, step S711 is performed. If the designated movement is not confirmed, step S716 is performed.

Step S710: Press the joystick or release the touchpad.

A placement selection and confirmation mechanism is also designed to be very convenient. When the user presses the joystick or releases the touchpad, a placement determination mechanism is triggered, and step S709 is performed.

Step S711: Start the placement mechanism.

The placement mechanism is started after the designated movement is confirmed.

That is, an operation of generating placement of the virtual character is triggered.

Step S712: Control a camera to cut to black.

The virtual character is kept still, that is, kept in a static state, at a current position and the camera is controlled to slowly cut to black after the placement mechanism is started. The camera is used for displaying a picture of the VR scene.

Step S713: Determine a position and a direction of a new place according to the designated movement.

The position and the direction of the new place that the virtual character is to reach are determined according to the designated movement.

Step S714: Play a special effect.

The virtual character is enabled to disappear suddenly at the current position after the camera is controlled to cut to black, and a special effect of whirling dots may be played.

Step S715: Control the camera to restore display.

The camera is controlled to restore display, and the virtual character is controlled to arrive at a position and an orientation that are indicated by the new place in the VR scene. As the camera slowly restores display, the virtual character does not change, that is, is kept in a static state, at the position and orientation indicated by the new place. In this process, the user does not feel the acceleration and speed from continuous movement of the virtual character and therefore does not feel dizzy.

When the virtual character suddenly appears at the new place, the special effects of whirling dots appear simultaneously at the new place and an original place. The dots at the original place are then deflected towards the new place during disturbance like being blown by wind. The special effects at the new place and the original place are used for indicating occurrences at the places to other users. A direction of a particle wind is used for indicating an origin and a destination of a change process of placement of a current user to the other users.

Step S716: Cancel the placement selection mechanism.

When the buffering time does not end, for example, when a user of Oculus releases the joystick or a user of Vive lifts the large circular touchpad, or after it is found through checking that the target position is not valid, or if the designated movement is not confirmed, the placement selection mechanism is canceled.

During placement selection of the virtual character in this embodiment, once a change process of a position and an angle of placement of the virtual character is started, the change process stays on. At the instant when the change process of the position and angle ends, it is determined whether the position and angle of the placement after the change meet requirements to perform a next operation. For example, the validity of the target position is checked. The designated movement is confirmed when it is found through checking that the target position is valid, and the placement selection mechanism is canceled when it is found through checking that the target position is not valid, so that the virtual character is teleported to avoid continuous movement, and a direction special effect is used for enabling other players in a scene to clearly see a placement process of the virtual character, so that an operation method adapts to various hardware specifications, operations are simple and convenient and can be easily learned, and desirable performance is achieved in a large-scale multiplayer real-time online scene.

The application environment in this embodiment of the present application may be, but is not limited to, the application environment in the foregoing embodiments. This is not described in detail again in this embodiment. An embodiment of the present application provides an optional specific application of the method for controlling placement of a virtual character. Specifically, the method is described by using an example in which the VR scene is a game application.

A design form of the embodiment mainly includes two parts. One part takes place before placement of the virtual character in the VR scene is determined, and the other part takes place after the placement of the virtual character in the VR scene is determined. The two parts are separately described below.

Before the placement of the virtual character in the VR scene is determined, first, in the placement triggering mechanism, the placement triggering mechanism is based on the physical gamepad. Placement triggering mechanisms on different platforms are slightly different. For example, the joystick is pushed in any direction to trigger selection of a placement position on the Oculus platform. The touchpad is pressed at any position to trigger placement selection on the Vive platform. The Oculus platform and the Vive platform have rather different physical keys but have a consistent design concept. That is, because the orientation of placement needs to be selected, physical keys for precisely controlling directions are required, and the joystick and the touchpad are the best choices.

Figure 8:
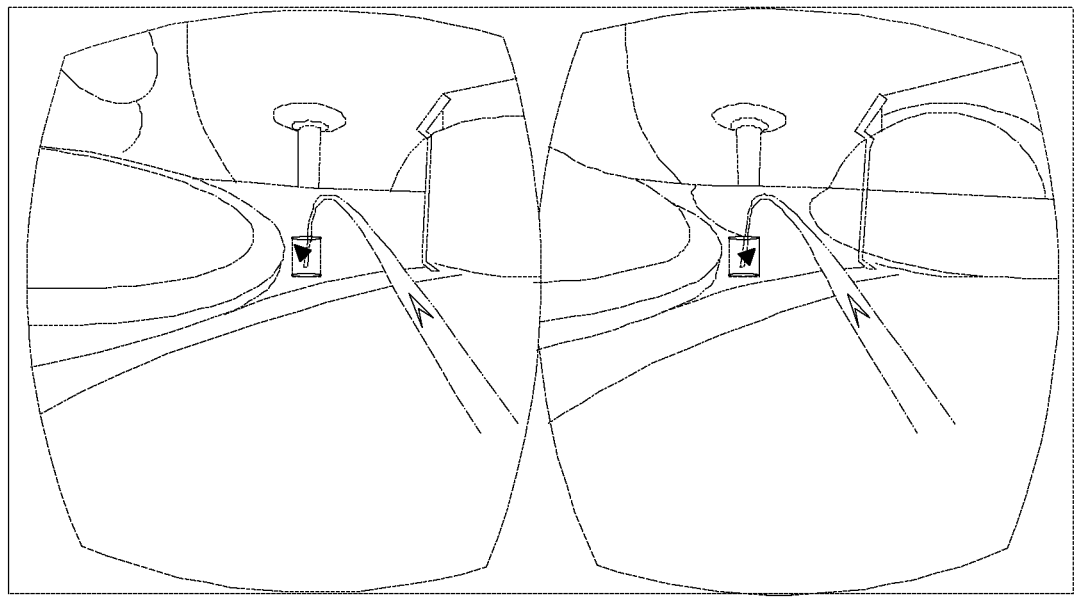
FIG. 8 is a schematic diagram of presenting a special effect of placement according to an embodiment of the present application.

Next, the placement triggering mechanism is very convenient the flexible. That is, placement may be triggered by mistake. Therefore, a placement cancellation mechanism is required. The buffering time for determining placement may be provided to a game player. The hesitation time is provided to the game player when the placement of the virtual character in the VR scene is determined. After the placement selection mechanism is triggered, a special effect presentation of the VR scene is slowly projecting a ray, for example, a curve with an arrow shown in FIG. 8, from the position of a hand of the game player towards the right front of a gamepad. FIG. 8 is a schematic diagram of presenting a special effect of placement according to an embodiment of the present application. The curve with the arrow may have a color. For example, the curve is blue, and it takes approximately one second for the end of the curve to bend and extend to the ground, and a presented special effect at the new position of the head of the curve appears. For example, the cylinder shown at the end of the curve shown in FIG. 8 appears. The extending process of the curve provides the hesitation time to the game player. That is, the buffering time for determining placement is provided to the game player.

According to some embodiments of the present application, the game player releases a joystick on the Oculus platform, and the game player lifts a large circular touchpad on the Vive platform, so as to cancel the placement selection mechanism, and the subsequent placement mechanism is not triggered. If a presented special effect appears at a position of an end to which the curve extends appears, for example, the cylinder shown at the end of the curve shown in FIG. 8 appears, it represents that a presentation scene of placement in the VR scene is triggered.

The placement selection and confirmation mechanism, that is, the placement determination mechanism is also designed to be very convenient. When the game player presses the joystick or releases the large circular touchpad, the placement determination mechanism is triggered.

Again, the position and direction of the placement are determined. The special effect of the cylinder at the end of the curve shown in FIG. 8 is used for presenting present the position and the orientation of the determined placement in the VR scene to the game player. According to some embodiments of the present application, to determine the position of the placement, the target position of the placement is determined an intersection position of the ground and the parabola that is drawn at a particular speed according to the right front of the hand of the game player. Therefore, the game player only needs to simply change the position of the hand and rotate the angle of the right front of the hand to radically adjust the target position of the placement. The angle of the placement is determined by using a direction selection mechanism of the gamepad. For example, the 360-degree directions of the joystick are mapped to the horizontal 360-degree directions of the target position on the Oculus platform. Therefore, the game player also only needs to very conveniently rotate the direction of the joystick to determine the target rotation position. For example, the presented special effect (the cylinder at the end of the curve in FIG. 8) at the end of the curve shown in FIG. 8 may use a protruding arrow to clearly present the target rotation position. Therefore, in this embodiment, a special effect of placement is used for presenting the placement of the virtual character to the game player in a highly visual manner, to enable the game player to learn about a position and an orientation of a place that the virtual character is to reach.

In addition, some virtual areas in a VR game scene are set to be inaccessible to the game player, but a parabola projected from the hand of the game player can reach any virtual area in the VR scene. Therefore, an accessible area to the game player needs to be restricted. According to some embodiments of the present application, an accessible area in the VR scene is marked. If the projected parabola intersects with the target position in an inaccessible area, because the virtual character cannot reach the virtual area, special effects of both the parabola and the target position are set to a distinctive color, for example, red, to remind the game player that the area is accessible. At this time, if the game player presses the joystick or lifts the large circular touchpad, the selected placement is canceled, and placement presentation is not triggered.

In the foregoing process, operations of the game player are as follows: The game player pushes a joystick on the Oculus platform to trigger a placement selection mechanism, then adjusts a spatial position and direction of a hand to determine a position of a designated movement, then adjusts a direction of the joystick to determine a direction of the designated movement, and finally presses the joystick to confirm start of placement; and the game player presses the touchpad on the Vive platform to trigger the placement selection mechanism, then adjusts a spatial position and direction of a hand to determine a position of a designated movement, then adjusts the position of the touch point of the hand on the touchpad to determine a direction of the designated movement, and finally lifts the hand to leave the touchpad to confirm start of placement. The entire operation process may be performed very conveniently and rapidly with one hand, so that the game player determines a destination of placement of the virtual character.

After the direction and position of the placement are confirmed, an operation of generating placement of the virtual character corresponding to the game player is triggered, and the following steps are then triggered:

First, for the game player, a current position of the virtual character corresponding to the game player in the VR scene is kept still, that is, kept in a static state, the camera then slowly cuts to black, and the camera then slowly restores display to show that the virtual character is at a previously selected new position and orientation. As the camera slowly restores display, the new position and orientation of the virtual character do not change either, that is, are kept in a static state. In such a process, the game player does not feel the acceleration and speed from continuous movement of the virtual character and therefore does not feel dizzy.

Figure 9:
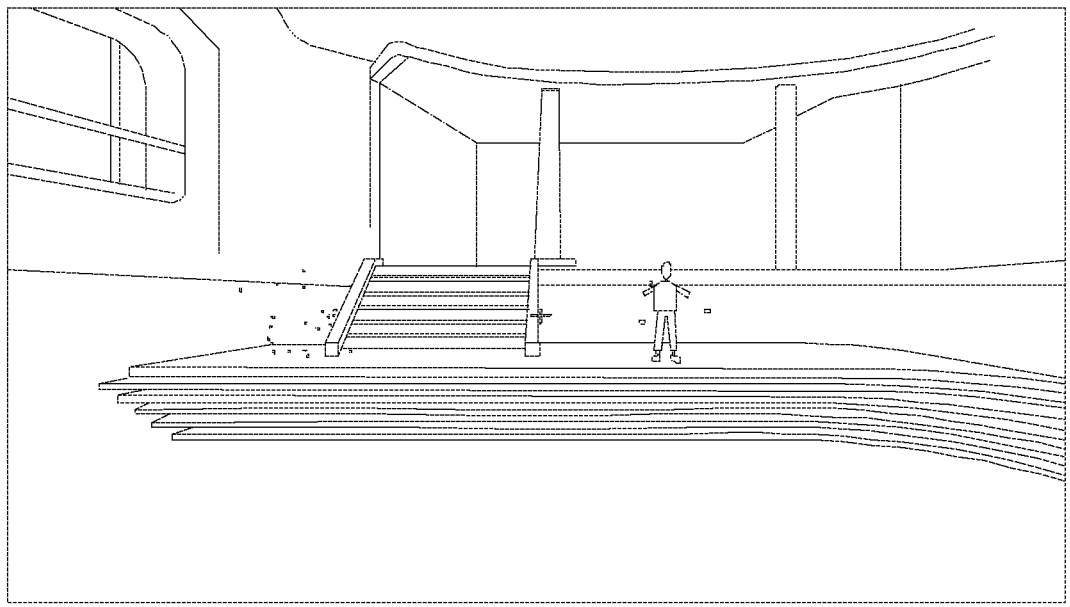
FIG. 9 is a schematic diagram of presenting another special effect of placement according to an embodiment of the present application.

Next, for other game players in the VR scene, the virtual character suddenly disappears from a starting position in the VR scene and suddenly appears at another new position, special effects of whirling dots appear simultaneously at two places, as shown in FIG. 9. FIG. 9 is a schematic diagram of presenting another special effect of placement according to an embodiment of the present application. Dots at an original position are deflected towards the new position during disturbance like being blown by wind. The special effect of the dots at the new position and the special effect of the dots at the original position are used for indicating occurrences at the places to other game players. A direction of the particle wind is used for indicating an origin and a destination of a change process of the placement of the current virtual character to the other game players.

In this embodiment, the operations of the game player are simple, convenient, and intuitive. During placement selection, the selected placement may be previewed to inform the game player of a result of the operations in a very intuitive manner. In the entire placement presentation process, the game player corresponding to the virtual character that undergoes placement feels comfortable and does not feel dizzy. In addition, during the placement presentation, the other game players also learn about the change process of placement of the virtual character. Therefore, the solution is also applicable to a large-scale multiplayer scene.

It should be noted that the foregoing presented special effect of placement may be adjusted. However, the objective and effect represented by the presented special effect are consistent with the objective and effect in the foregoing embodiment. That is, the presented special effect provides a buffering time for determining placement to the game player, so that the game player learns about the position and orientation of the place that the virtual character is to reach. The special effect at the new position and the special effect at the original position are used for indicating occurrences at the places to the other game players to indicate an origin and a destination of the change process of placement of the virtual character.

It should be noted that the implementation of this embodiment is compatible to two current commercially available mainstream headsets Oculus and Vive and corresponding operation gamepads. If a new hardware device emerges, operations of the hardware device are also applicable to the method for controlling placement of a virtual character in this embodiment of the present application.

It should be noted that the foregoing method embodiments are illustrated as a series of action combinations for ease of description; however, a person skilled in the art should know that the embodiments of the present application is not limited to the described order of actions, because based on the embodiments of the present application, some steps may be performed in another order or at the same time. Next, a person skilled in the art should know that the embodiments described in the specification are all exemplary embodiments, and the involved actions and modules are not necessarily required in the present application.

Through the above description of the implementations, it is clear to persons skilled in the art that the foregoing embodiments may be accomplished through software plus a necessary universal hardware platform or may certainly also be accomplished through hardware. However, software programs plus a necessary universal hardware platform are generally a preferred implementation. Based on this, the technical solutions of the embodiments of the present application or the part that makes contributions to the existing technology can be substantially embodied in the form of a software product. The computer software product may be stored in a non-volatile computer readable storage medium (for example, a ROM/RAM, a magnetic disk or an optical disk), and contain several machine readable instructions to instruct a terminal device (for example, a mobile phone, a computer, a server, or a network device) to perform the method described in the embodiments of the present application.

Figure 10A:
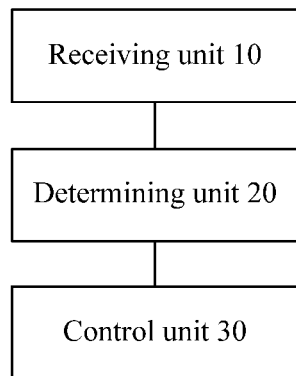
FIG. 10a is a schematic diagram of an apparatus for controlling placement of a virtual character according to an embodiment of the present application.

An embodiment of the present application further provides an apparatus for controlling placement of a virtual character configured to implement the foregoing method for controlling placement of a virtual character. FIG. 10a is a schematic diagram of the apparatus for controlling placement of a virtual character according to an embodiment of the present application. As shown in FIG. 10a, the apparatus may include a receiving unit 10, a determining unit 20, and a control unit 30.

The receiving unit 10 is configured to receive a first instruction used for instructing to generate designated movement of a virtual character from a first position in a VR scene.

The determining unit 20 is configured to determine a second position away from the first position by the designated movement after the first instruction is received.

The control unit 30 is configured to control the virtual character to disappear from the first position and control the virtual character to appear at the second position, the virtual character having not appeared between the first position and the second position.

According to some embodiments of the present application, the control unit 30 includes a first control module and a second control module. The first control module is configured to control the virtual character to stay at the first position and control a viewer to cut to black after the second position is determined, where the viewer is used for displaying a picture of the VR scene. The second control module is configured to control the viewer to restore display and control the virtual character to stay at the second position after the viewer is controlled to cut to black.

According to some embodiments of the present application, the first control module is configured to control the viewer to gradually cut to black, where the virtual character is kept at the first position as the viewer gradually cuts to black; and the second control module is configured to control the viewer to gradually restore display, where the virtual character is kept at the second position as the viewer gradually restores display.

According to some embodiments of the present application, the control unit 30 includes a third control module and a fourth control module. The third control module is configured to: control the virtual character to disappear from the first position, and display first indication information at the first position after the second position is determined, where the first indication information is used for indicating an occurrence at the first position in the VR scene. The fourth control module is configured to: control the virtual character to appear at the second position, and display second indication information at the second position, where the second indication information is used for indicating an occurrence at the second position in the VR scene.

According to some embodiments of the present application, the third control module includes: a first display submodule, configured to display a moving first dot at the first position, where the first indication information includes the moving first dot; and the fourth control module includes: a second display submodule, configured to display a moving second dot at the second position, where the second indication information includes the moving second dot, and a moving direction from the first dot to the second dot is used for representing a change process of the virtual character from the first position to the second position.

Figure 10B:
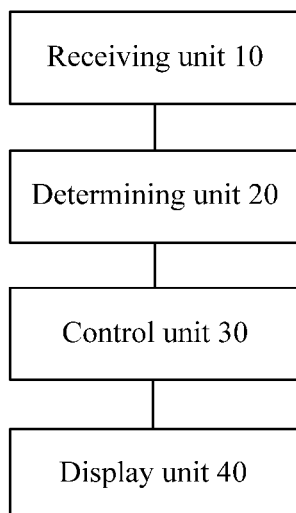
FIG. 10b is a schematic diagram of an apparatus for controlling placement of a virtual character according to an embodiment of the present application.

According to some embodiments of the present application, as shown in FIG. 10b, the apparatus further includes: a display unit 40, configured to display third indication information used for indicating the designated movement before the second position away from the first position by the designated movement is determined. The determining unit 20 includes: a first determining module, configured to determine the second position according to the third indication information.

According to some embodiments of the present application, the display unit 40 includes: a display module, configured to display a curve used for indicating the designated movement, where the third indication information includes the curve.

The first determining module includes a first determining submodule and a second determining submodule. The first determining submodule is configured to determine an intersection position of the curve and a preset plane, where the preset plane is used for supporting the virtual character. The second determining submodule is configured to determine an area within a preset distance range away from the intersection position as a position indicated by the second position.

According to some embodiments of the present application, the second determining submodule is further configured to: detect whether the second position is valid in the VR scene; determine the area within the preset distance range away from the intersection position as the position indicated by the second position if it is detected that the second position is valid in the VR scene; and display preset mark information if it is detected that the second position is not valid in the VR scene, where the preset mark information is used for indicating that the second position is not valid in the VR scene.

Figure 10C:
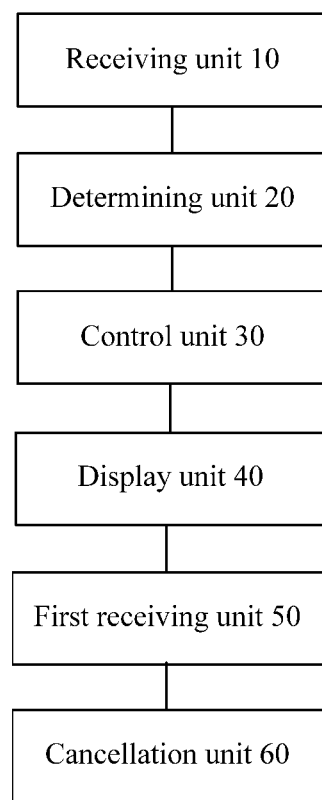
FIG. 10c is a schematic diagram of an apparatus for controlling placement of a virtual character according to an embodiment of the present application.

According to some embodiments of the present application, as shown in FIG. 10c, the apparatus further includes a first receiving unit 50 and a cancellation unit 60. The first receiving unit 50 is configured to: receive a second instruction after the third indication information used for indicating the designated movement is displayed, where the second instruction is used for instructing to cancel placement of the virtual character from the first position, and the placement includes the designated movement; and the cancellation unit 60 is configured to control the virtual character to cancel the designated movement from the first position after the second instruction is received.

According to some embodiments of the present application, the determining unit 20 includes: a first receiving module, configured to receive a third instruction, where the third instruction is used for indicating a position indicated by the second position; and a second determining module, configured to determine the position indicated by the second position after the third instruction is received.

According to some embodiments of the present application, the first receiving module includes: a first acquiring submodule, configured to acquire position information of a first operating object in a real-world scene, where the first operating object is configured to adjust the position indicated by the second position, and the position information corresponds to the position indicated by the second position; and a second acquiring submodule, configured to acquire the third instruction according to the position information.

According to some embodiments of the present application, the determining unit 20 includes: a second receiving module, configured to receive a fourth instruction, where the fourth instruction is used for indicating an orientation indicated by the second position; and a third determining module, configured to determine the orientation indicated by the second position after the fourth instruction is received.

According to some embodiments of the present application, the second receiving module includes: a third acquiring submodule, configured to acquire angle information of a second operating object in a real-world scene, where the second operating object is configured to adjust the orientation indicated by the second position, and the angle information corresponds to the orientation indicated by the second position; and a fourth acquiring submodule, configured to acquire the fourth instruction according to the angle information.

According to some embodiments of the present application, the receiving unit 10 includes: a third receiving module, configured to receive the first instruction by using a joystick; and the determining unit 20 includes: a fourth determining module, configured to determine the second position by using the joystick; or the receiving unit 10 includes: a fourth receiving module, configured to receive the first instruction by using a touchpad; and the determining unit 20 includes: a fifth determining module, configured to determine the second position by using the touchpad.

It should be noted that the receiving unit 10 in this embodiment may be configured to perform step S202 in the foregoing method embodiment of the present application, the determining unit 20 in this embodiment may be configured to perform step S204 in the foregoing method embodiment of the present application, and the control unit 30 in this embodiment may be configured to perform step S206 in the foregoing method embodiment of the present application.

The receiving unit 10 in this embodiment receives the first instruction used for instructing to generate the designated movement of the virtual character from the first position in the VR scene, the determining unit 20 determines the second position away from the first position by the designated movement after the first instruction is received, and the control unit 30 controls the virtual character to disappear from the first position and controls the virtual character to appear at the second position, the virtual character having not appeared between the first position and the second position, that is, the virtual character is controlled to disappear from the first position and the virtual character is controlled to appear at the second position in the VR scene, so that the virtual character is teleported to avoid continuous movement, and a technical effect of preventing a user from easily feeling dizzy because of continuous movement of a virtual character is achieved, thereby resolving a technical problem in related technologies that a user easily feels dizzy because of continuous movement of a virtual character.

It should be noted here that the foregoing units and modules have examples and application scenarios the same as those implemented by the steps in the corresponding method embodiments, but are not limited to the content disclosed in the foregoing method embodiment. It should be noted that the foregoing modules may be run as a part of the apparatus in the hardware environment shown in FIG. 1, and may be implemented by software or by hardware, where the hardware environment includes a network environment.

An embodiment of the present application further provides a computing device, for example, a server or a terminal, configured to implement the foregoing method for controlling placement of a virtual character.

Figure 11:
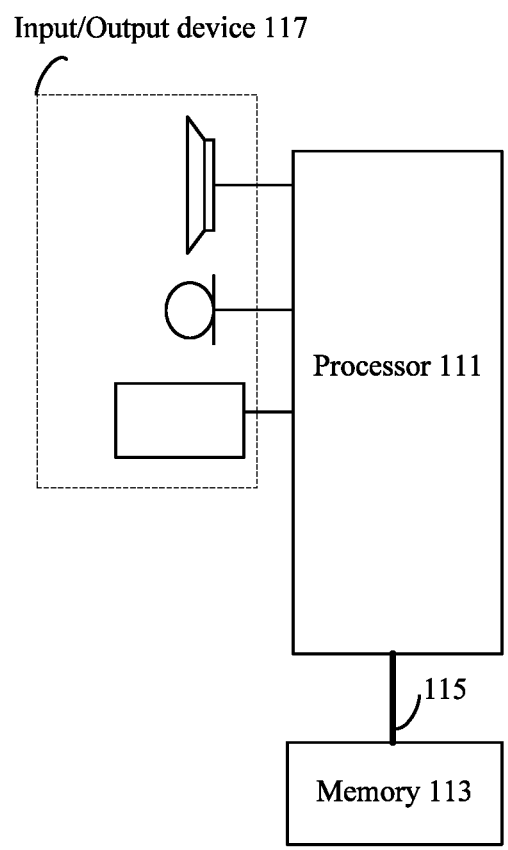
FIG. 11 is a structural block diagram of a terminal according to an embodiment of the present application.

FIG. 11 is a structural block diagram of a terminal according to an embodiment of the present application. As shown in FIG. 11, the terminal may include one or more (only one processor is shown in the figure) processors 111, a memory 113, and a transmission apparatus 115. As shown in FIG. 11, the terminal may further include an input/output device 117.

The memory 113 may be configured to store a software program and a machine readable instruction module, for example, program instructions/modules corresponding to the method and apparatus for controlling placement of a virtual character in the embodiments of the present application. The processor 111 runs the software program and module stored in the memory 113 to implement various functional applications and data processing, that is, implement the foregoing method for controlling placement of a virtual character. The memory 113 may include a high-speed random access memory (RAM), and may also include a nonvolatile memory, for example, one or more magnetic storage devices, flash memories or other nonvolatile solid-state memories. In some embodiments, the memory 113 may further include memories remotely disposed relative to the processor 111, and these remote memories may be connected to the terminal via a network. Examples of the network include, but are not limited to, the Internet, an intranet, a local area network, a mobile communications network, or a combination thereof The transmission apparatus 115 is configured to receive or send data via one network, and may further be configured to perform data transmission between the processor and the memory. Specific examples of the network may include a wired network and a wireless network. In an example, the transmission apparatus 115 includes a network interface controller (NIC) that may be connected to another network device or router via a network cable to communicate with the Internet or a local area network. In an example, the transmission apparatus 115 is a radio frequency (RF) module that is configured to wirelessly communicate with the Internet.

Specifically, the memory 113 is configured to store an application program, that is, machine readable instructions.

The processor 111 may invoke and execute the application program stored in the memory 113 via the transmission apparatus 115 to perform the following steps:

receiving a first instruction used for instructing to generate designated movement of a virtual character from a first position in a VR scene;

determining a second position away from the first position by the designated movement after the first instruction is received; and controlling the virtual character to disappear from the first position and controlling the virtual character to appear at the second position, the virtual character having not appeared between the first position and the second position.

The processor 111 is further configured to perform the following steps: controlling the virtual character to stay at the first position and controlling a viewer to cut to black after the second position is determined, where the viewer is used for displaying a picture of the VR scene; and controlling the viewer to restore display and controlling the virtual character to stay at the second position after the viewer is controlled to cut to black.

The processor 111 is further configured to perform the following steps: controlling the viewer to gradually cut to black, where the virtual character is kept at the first position as the viewer gradually cuts to black; and controlling the viewer to gradually restore display, where the virtual character is kept at the second position as the viewer gradually restores display.

The processor 111 is further configured to perform the following steps: controlling the virtual character to disappear from the first position, and displaying first indication information at the first position after the second position is determined, where the first indication information is used for indicating an occurrence at the first position in the VR scene; and controlling the virtual character to appear at the second position, and displaying second indication information at the second position, where the second indication information is used for indicating an occurrence at the second position in the VR scene.

The processor 111 is further configured to perform the following steps: displaying a moving first dot at the first position, where the first indication information includes the moving first dot; displaying a moving second dot at the second position, where the second indication information includes the moving second dot, and a moving direction from the first dot to the second dot is used for representing a change process of the virtual character from the first position to the second position.

The processor 111 is further configured to perform the following steps: displaying third indication information used for indicating the designated movement before the second position away from the first position by the designated movement is determined; and determining the second position according to the third indication information.

The processor 111 is further configured to perform the following steps: displaying a curve used for indicating the designated movement, where the third indication information includes the curve; determining an intersection position of the curve and a preset plane, where the preset plane is used for supporting the virtual character; and determining an area within a preset distance range away from the intersection position as a position indicated by the second position.

The processor 111 is further configured to perform the following steps: detecting whether the second position is valid in the VR scene; determining the area within the preset distance range away from the intersection position as the position indicated by the second position if it is detected that the second position is valid in the VR scene; and displaying preset mark information if it is detected that the second position is not valid in the VR scene, where the preset mark information is used for indicating that the second position is not valid in the VR scene.

The processor 111 is further configured to perform the following steps: receiving a second instruction after the third indication information used for indicating the designated movement is displayed, where the second instruction is used for instructing to cancel placement of the virtual character from the first position, and the placement includes the designated movement; and controlling the virtual character to cancel the designated movement from the first position after the second instruction is received.

The processor 111 is further configured to perform the following steps: receiving a third instruction, where the third instruction is used for indicating a position indicated by the second position; and determining the position indicated by the second position after the third instruction is received.

The processor 111 is further configured to perform the following steps: acquiring position information of a first operating object in a real-world scene, where the first operating object is configured to adjust the position indicated by the second position, and the position information corresponds to the position indicated by the second position; and acquiring the third instruction according to the position information.

The processor 111 is further configured to perform the following steps: receiving a fourth instruction, where the fourth instruction is used for indicating an orientation indicated by the second position; and determining the orientation indicated by the second position after the fourth instruction is received.

The processor 111 is further configured to perform the following steps: acquiring angle information of a second operating object in a real-world scene, where the second operating object is configured to adjust the orientation indicated by the second position, and the angle information corresponds to the orientation indicated by the second position; and acquiring the fourth instruction according to the angle information.

The embodiments of the present application provide a solution for controlling placement of a virtual character. A first instruction used for instructing to generate designated movement of a virtual character from a first position is received in a VR scene; a second position away from the first position by the designated movement is determined after the first instruction is received; and the virtual character is controlled to disappear from the first position and the virtual character is controlled to appear at the second position, the virtual character having not appeared between the first position and the second position, that is, the virtual character is controlled to disappear from the first position and the virtual character is controlled to appear at the second position in the VR scene, so that the virtual character is teleported to avoid continuous movement, and a technical effect of preventing a user from easily feeling dizzy because of continuous movement of a virtual character is achieved, thereby resolving a technical problem in related technologies that a user easily feels dizzy because of continuous movement of a virtual character.

According to some embodiments of the present application, for specific examples in this embodiment, refer to the examples described in the foregoing embodiments. Details are not described herein again in detail in this embodiment.

A person of ordinary skill in the art may understand that the structure in FIG. 11 is only shown schematically. The terminal may be a terminal device such as a smartphone (for example, an Android phone, and an iOS phone), a tablet computer, a handheld computer, a mobile Internet device (MID), and a PAD. FIG. 11 does not constitute a limitation to the structure of the foregoing electronic apparatus. For example, the terminal may include more or fewer components (for example, a network interface, and a display apparatus) than those shown in FIG. 11, or have a configuration different from that shown in FIG. 11.

A person of ordinary skill in the art may understand that all or some of the steps in the methods in the foregoing embodiments may be implemented by a program instructing relevant hardware of a terminal device. The program may be stored in a computer readable storage medium. The storage medium may be a flash memory, a read-only memory (ROM), a RAM, a magnetic disk, an optical disc, or the like.

An embodiment of the present application further provides a non-volatile computer readable storage medium. In this embodiment of the present application, the foregoing storage medium may be configured to store program code of the method for controlling placement of a virtual character provided in the foregoing method embodiments.

In this embodiment of the present application, the foregoing storage medium may be located on least one of a plurality of network devices in the network shown in the foregoing embodiments.

In this embodiment of the present application, the storage medium is configured to store program code used for performing the following steps:

receiving a first instruction used for instructing to generate designated movement of a virtual character from a first position in a VR scene;

determining a second position away from the first position by the designated movement after the first instruction is received; and controlling the virtual character to disappear from the first position and controlling the virtual character to appear at the second position, the virtual character having not appeared between the first position and the second position.

According to some embodiments of the present application, the storage medium is further configured to store program code used for performing the following steps: controlling the virtual character to stay at the first position and controlling a viewer to cut to black after the second position is determined, where the viewer is used for displaying a picture of the VR scene; and controlling the viewer to restore display and controlling the virtual character to stay at the second position after the viewer is controlled to cut to black.

According to some embodiments of the present application, the storage medium is further configured to store program code used for performing the following steps: controlling the viewer to gradually cut to black, where the virtual character is kept at the first position as the viewer gradually cuts to black; and controlling the viewer to gradually restore display, where the virtual character is kept at the second position as the viewer gradually restores display.

According to some embodiments of the present application, the storage medium is further configured to store program code used for performing the following steps: controlling the virtual character to disappear from the first position, and displaying first indication information at the first position after the second position is determined, where the first indication information is used for indicating an occurrence at the first position in the VR scene; and controlling the virtual character to appear at the second position, and displaying second indication information at the second position, where the second indication information is used for indicating an occurrence at the second position in the VR scene.

According to some embodiments of the present application, the storage medium is further configured to store program code used for performing the following steps: displaying a moving first dot at the first position, where the first indication information includes the moving first dot; displaying a moving second dot at the second position, where the second indication information includes the moving second dot, and a moving direction from the first dot to the second dot is used for representing a change process of the virtual character from the first position to the second position.

According to some embodiments of the present application, the storage medium is further configured to store program code used for performing the following steps: displaying third indication information used for indicating the designated movement before the second position away from the first position by the designated movement is determined; and determining the second position according to the third indication information.

According to some embodiments of the present application, the storage medium is further configured to store program code used for performing the following steps: displaying a curve used for indicating the designated movement, where the third indication information includes the curve; determining an intersection position of the curve and a preset plane, where the preset plane is used for supporting the virtual character; and determining an area within a preset distance range away from the intersection position as a position indicated by the second position.

According to some embodiments of the present application, the storage medium is further configured to store program code used for performing the following steps: detecting whether the second position is valid in the VR scene; determining the area within the preset distance range away from the intersection position as the position indicated by the second position if it is detected that the second position is valid in the VR scene; and displaying preset mark information if it is detected that the second position is not valid in the VR scene, where the preset mark information is used for indicating that the second position is not valid in the VR scene.

According to some embodiments of the present application, the storage medium is further configured to store program code used for performing the following steps: receiving a second instruction after the third indication information used for indicating the designated movement is displayed, where the second instruction is used for instructing to cancel placement of the virtual character from the first position, and the placement includes the designated movement; and controlling the virtual character to cancel the designated movement from the first position after the second instruction is received.

According to some embodiments of the present application, the storage medium is further configured to store program code used for performing the following steps: receiving a third instruction, where the third instruction is used for indicating a position indicated by the second position; and determining the position indicated by the second position after the third instruction is received.

According to some embodiments of the present application, the storage medium is further configured to store program code used for performing the following steps: acquiring position information of a first operating object in a real-world scene, where the first operating object is configured to adjust the position indicated by the second position, and the position information corresponds to the position indicated by the second position; and acquiring the third instruction according to the position information.

According to some embodiments of the present application, the storage medium is further configured to store program code used for performing the following steps: receiving a fourth instruction, where the fourth instruction is used for indicating an orientation indicated by the second position; and determining the orientation indicated by the second position after the fourth instruction is received.

According to some embodiments of the present application, the storage medium is further configured to store program code used for performing the following steps: acquiring angle information of a second operating object in a real-world scene, where the second operating object is configured to adjust the orientation indicated by the second position, and the angle information corresponds to the orientation indicated by the second position; and acquiring the fourth instruction according to the angle information.

For specific examples of this embodiments, refer to examples described in the foregoing embodiments. Details are not described herein again in detail in this embodiment.

In this embodiment, the foregoing storage medium may include, but is not limited to a Universal Serial Bus (USB) flash drive, a ROM, a RAM, a removable hard disk, a magnetic disk, an optical disc, among various other media that can store program code.

If the integrated units in the foregoing embodiments are implemented in a form of software functional units and are sold or used as an independent product, the units may be stored in a computer readable storage medium. Based on this, the foregoing technical solutions of the embodiments of the present application or the entire technical solution or the part that makes contributions to the existing technology can be substantially embodied in the form of a software product. The computer software product may be stored in a storage medium and contain several machine readable instructions to instruct one or more pieces of computer equipment (for example, a personal computer, a server, or network equipment) to perform all or some the steps of the method described in the embodiments of the present application.

In the foregoing embodiments of the present application, descriptions of the embodiments have different emphases, and as for parts that are not described in detail in one embodiment, refer to the relevant descriptions of the other embodiments.

In the several embodiments provided in the present application, it should be understood that the disclosed client may be implemented in other manners. The described apparatus embodiments are merely schematic. For example, division of the units is merely division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of the present application may be integrated into one processing unit, or each of the units may exist alone physically, or two or more units may be integrated into one unit. The integrated units may be implemented in a form of hardware or may be implemented in a form of a software functional unit.

Only exemplary embodiments of the present application are described. It should be noted by persons of ordinary skill in the art that improvements and modifications may be made without departing from the principle of the present application, which should be construed as falling within the protection scope of the present application.

What is claimed is:
1. A method for controlling placement of a virtual character, implemented by a computing device, and comprising:
   displaying a virtual character at a first position in a virtual reality (VR) scene;

receiving a first instruction in the VR scene, the first instruction indicating moving the virtual character from the first position by a designated movement;

displaying, in response to receiving the first instruction, third indication information as a preview of the designated movement in the VR scene;

determining, according to the first instruction, a second position by the designated movement from the first position in response to the first instruction;

removing the virtual character from the first position; and placing the virtual character at the second position, the virtual character not appearing between the first position and the second position after being removed from the first position.

2. The method according to claim 1, further comprising:

maintaining the virtual character at the first position;

controlling a viewer to cut to black screen after the second position is determined, the viewer displaying the VR scene;

placing the virtual character at the second position after the viewing camera cutting to black; and controlling the viewer to restore a display of the VR scene.

3. The method according to claim 2, further comprising:

controlling the viewer to gradually cut to black, the virtual character staying at the first position as the viewer gradually cutting to black; and controlling the viewer to gradually restore the display of the VR scene, the virtual character being placed at the second position as the viewer gradually restores the display.

4. The method according to claim 1, further comprising:

removing the virtual character from the first position, and displaying first indication information at the first position after the second position is determined, the first indication information indicating an occurrence at the first position in the VR scene; and placing the virtual character at the second position, and displaying second indication information at the second position, the second indication information indicating an occurrence at the second position in the VR scene.

5. The method according to claim 4, further comprising:

displaying a moving first dot at the first position, the first indication information comprising the moving first dot; and displaying a moving second dot at the second position, the second indication information comprising the moving second dot, and a moving direction from the first dot to the second dot representing the virtual character moving from the first position to the second position.

6. The method according to claim 1, further comprising:

displaying a curve used for indicating the designated movement, the third indication information comprising the curve;

determining an intersection position of the curve and a plane, the plane supporting the virtual character in the VR scene; and determining an area within a distance of the intersection position as a position indicated by the second position.

7. The method according to claim 6, further comprising:

detecting whether the second position is valid in the VR scene;

determining the area within the distance from the intersection position as the position indicated by the second position if the second position is valid in the VR scene; and displaying preset mark information if the second position is not valid in the VR scene, the mark information indicating that the second position is not valid in the VR scene.

8. The method according to claim 1, further comprising:

displaying, in response to receiving the first instruction, the third indication information as the preview of the designated movement in the VR scene for a buffering time duration; and determining, according to the first instruction, the second position by the designated movement from the first position in response to the first instruction not being cancelled in the buttering time duration.

9. The method according to claim 8, further comprising:

receiving a second instruction within the buffering time duration, the second instruction indicating cancelling moving the virtual character from the first position by the designated movement; and maintaining the virtual character at the first position after the second instruction is received.

10. The method according to claim 8, wherein displaying the third indication information comprises:

displaying an extending process of a ray, a duration of the extending process being the buffering time duration, an extending destination of a head of the ray being the second position.

11. The method according to claim 10, wherein the ray is a curve, and displaying the extending process of the ray comprises projecting the curve from a position corresponding to a hand of the user towards a front direction of a controller of the user; and bending and extending the curve to reach the second position at an end of the extending process.

12. The method according to claim 1, further comprising:

receiving a third instruction, the third instruction indicating a location indicated by the second position; and determining the location indicated by the second position after the third instruction is received.

13. The method according to claim 12, wherein the receiving a third instruction comprises:

acquiring location information of a first operating object in a real-world scene, the first operating object being configured to adjust the location indicated by the second position, and the location information corresponding to the second position; and acquiring the third instruction according to the location information.

14. The method according to claim 1, further comprising:

receiving a fourth instruction, the fourth instruction indicating an orientation indicated by the second position; and determining the orientation indicated by the second position after the fourth instruction is received.

15. The method according to claim 14, further comprising:

acquiring angle information of a second operating object in a real-world scene, the second operating object being configured to adjust the orientation of the second position, and the angle information corresponding to the orientation of the second position; and acquiring the fourth instruction according to the angle information.

16. The method according to claim 1, further comprising:

receiving the first instruction in response to one or more user operations on a physical controller; and determining the second position by using the physical controller.

17. An apparatus for controlling placement of a virtual character in virtual reality (VR) scene, comprising:
 a processor and a memory connected to the processor, the memory storing machine readable instructions executable by the processor, and the processor executing the machine readable instructions to perform:
 displaying a virtual character at a first position in a virtual reality (VR) scene;
 receiving a first instruction in the VR scene, the first instruction indicating moving the virtual character from the first position by a designated movement;
 displaying, in response to receiving the first instruction, third indication information as a preview of the designated movement in the VR scene;
 determining, according to the first instruction, a second position by the designated movement from the first position in response to the first instruction;
 removing the virtual character from the first position; and
 placing the virtual character at the second position, the virtual character not appearing between the first position and the second position after being removed from the first position.

18. The apparatus according to claim 17, wherein the processor executes the machine readable instructions to implement:
 maintaining the virtual character at the first position;
 controlling a viewer to cut to black screen after the second position is determined, the viewer displaying the VR scene;
 placing the virtual character at the second position after the viewing camera cutting to black; and
 controlling the viewer to restore a display of the VR scene.

19. The apparatus according to claim 17, wherein the processor executes the machine readable instructions to implement:
 displaying, in response to receiving the first instruction, the third indication information as the preview of the designated movement in the VR scene for a buffering time duration; and
 determining, according to the first instruction, the second position by the designated movement from the first position in response to the first instruction not being cancelled in the buttering time duration.

20. A non-transitory computer readable storage medium, the storage medium storing machine readable instructions, and the machine readable instructions being executable by a processor to perform:
 displaying a virtual character at a first position in a virtual reality (VR) scene;
 receiving a first instruction in the VR scene, the first instruction indicating moving the virtual character from the first position by a designated movement;
 displaying, in response to receiving the first instruction, third indication information as a preview of the designated movement in the VR scene;
 determining, according to the first instruction, a second position by the designated movement from the first position in response to the first instruction;
 removing the virtual character from the first position; and
 placing the virtual character at the second position, the virtual character not appearing between the first position and the second position after being removed from the first position.

* * * * *